United States Patent [19]

Avitan et al.

[11] Patent Number: 4,942,529
[45] Date of Patent: Jul. 17, 1990

[54] LIFT TRUCK CONTROL SYSTEMS

[75] Inventors: Isaac Avitan, Vestal; Ralph Allen, Greene; David L. Kellogg, Greene; Stephen L. Page, Greene; David J. Radley, Whitney Point, all of N.Y.

[73] Assignee: The Raymond Corporation, New York, N.Y.

[21] Appl. No.: 199,782

[22] Filed: May 26, 1988

[51] Int. Cl.⁵ .................................................. G06F 15/20
[52] U.S. Cl. ............................ 364/424.01; 340/685; 414/636
[58] Field of Search ............. 364/424.07, 463, 550, 364/571; 340/685; 414/636; 180/282, 290

[56] References Cited

U.S. PATENT DOCUMENTS

| | | | |
|---|---|---|---|
| 4,354,568 | 10/1982 | Griesenbrock | 364/424.07 |
| 4,499,541 | 2/1985 | Yuki et al. | 364/424.07 |
| 4,511,974 | 4/1985 | Nakane et al. | 364/463 |
| 4,517,645 | 5/1985 | Yuki et al. | 364/424.07 |
| 4,742,468 | 5/1988 | Ohashi et al | 364/424.07 |

Primary Examiner—Thomas G. Black
Attorney, Agent, or Firm—Limbach, Limbach & Sutton

[57] ABSTRACT

A travel speed limiting control system for lift trucks, particularly of the "orderpicker" type, having an extendible mast, is disclosed. The truck travel speed which the operator can command is limited by factors including load weight, load elevation, heading angle and direction of truck travel (forward or reverse). Optionally, other factors may be involved, such as lateral tilt and load moment. An algorithm including the desired input factors is continually processed by an on-board microcomputer to provide an instantaneous speed limit signal. In addition to its normal operating mode, the microcomputer is also arranged to operate in a "learn" mode, whereby it runs through the ranges of various input signals and develops a set of stored values which indicate the allowable ranges of the inputs, as well as offset or bias values which compensate for manufacturing tolerances occurring in the components of the system.

22 Claims, 9 Drawing Sheets

LIFT TRUCK CONTROL SYSTEMS

FIELD OF INVENTION

This invention relates to lift truck control systems, and more particularly, to an improved lift truck traction motor control system which will more intelligently limit the travel speed of a lift truck to comply with industry standards, good engineering practice and the need for truck productivity.

BACKGROUND OF THE INVENTION

Prior art has recognized that for certain lift truck operating conditions, the truck may become unstable, and various systems for limiting or curtailing various lift truck operations have been used in the past. In many cases lift truck travel speed has been decreased to an unnecessarily low value, decreasing productivity more than necessary.

In a preferred form of the invention involving a rider-controlled vehicle, a plurality of vehicle conditions are sensed, and in response to those conditions a value representing a travel speed at which the vehicle can be driven in an instantaneously stable condition is derived. That value may be called the "instantaneous speed limit", and the signal representative thereof may be called the "instantaneous speed limit signal". That signal, together with the speed and acceleration desired by the rider, or operator, is connected to the vehicle traction motor control system so that vehicle speed ordinarily cannot exceed the speed represented by the instantaneous speed limit signal. The operator ordinarily will indicate a desire for an increase or a decrease in speed by his manual positioning of a control handle. According to the invention, vehicle travel may occur at any speed less than that represented by the instantaneous speed limit, or even at zero speed, if such a lesser speed is requested by the operator input signal. With the truck proceeding at the speed commensurate with the instantaneous speed limit signal, a sensed vehicle condition may change so as to reduce the magnitude of the instantaneous speed limit signal. The load elevation might increase, for example. Under such circumstances, the instantaneous speed limit signal will momentarily be less than a signal representing the truck travel speed. In a preferred embodiment of the invention, the occurrence of such a condition results in the reduction of tractive effort, but in no decelerating force other than that provided by motor, gearing, and tire friction, so the vehicle will coast at a descending speed until vehicle speed reaches the new instantaneous speed limit. In some applications of the invention, it may be deemed desirable to apply some additional decelerating force.

DESCRIPTION OF THE PRIOR ART

Some prior art of interest in connection with the present invention is described in the following U.S. Pat. Nos.:

| Remde | U.S. Pat. No. 2,751,994 | Gregg | U.S. Pat. No. 4,093,091 |
|---|---|---|---|
| Draxler | U.S. Pat. No. 2,790,513 | Allen | U.S. Pat. No. 4,122,957 |
| Comfort | U.S. Pat. No. 2,935,161 | Lewis | U.S. Pat. No. 4,534,433 |
| Pien | U.S. Pat. No. 3,059,710 | Dammeyer | U.S. Pat. No. 4,265,337 |
| Thomas | U.S. Pat. No. 3,524,522 | Dammeyer | U.S. Pat. No. 4,280,205 |
| Ulinski | U.S. Pat. No. 3,542,161 | Thomasson | U.S. Pat. No. 4,368,824 |
| Bilco | U.S. Pat. No. 3,550,471 | Downing | U.S. Pat. No. 4,398,860 |
| Young | U.S. Pat. No. 3,831,492 | Nakane | U.S. Pat. No. 4,511,974 |
| Bates | U.S. Pat. No. 3,834,494 | Adams | U.S. Pat. No. 4,547,844 |
| Pietzch | U.S. Pat. No. 4,057,792 | Schultz | U.S. Pat. No. 4,598,797 |

Limiting maximum truck speed inversely in accordance with the elevation of a load along the truck mast is old and well-known and disclosed, for example, in U.S. Pat. Nos. 4,265,337 and 4,598,797. Early systems arbitrarily limited speed at one or several specific load elevations, but later systems tend to make allowable speed continuously vary inversely with load elevation over an appreciable range of load elevations. It is also known (U.S. Pat. No. 4,598,797) to limit allowable vehicle speed inversely in accordance with instantaneous heading angle. U.S. Pat. No. 3,834,494 teaches the use of lift cylinder pressure to limit load lifting speed, but not travel speed. Load lifting speed is not related to this invention.

The prior art discloses material handling devices such as lift trucks, cranes and the like, in which various factors are taken into account to determine if the devices are being operated properly. Factors such as load elevation, steering angle, load position are examples of the operating parameters which are measured, in either discrete values or continuously varying values, and the travel speed of the material handling devices modified accordingly. However, none of the known prior art either shows or suggests that the total load weight, along with other factors such as load elevation, steering angle, direction of travel, etc., should be entered as a factor in determining the desired travel speed.

While limiting vehicle speed in accordance with load elevation and steering angle can be generally desirable and indeed very desirable when given loads are being carried, they can have very undesirable effects, and unnecessarily interfere with productivity, in some situations. For example, an extreme elevation of a load carriage may provide very little or no reason to curtail vehicle travel speed if there is no payload, or a very small payload, on the forks. In accordance with one concept of the present invention, the instantaneous payload being carried by the truck is sensed, and used, along with load elevation, heading angle, and travel direction, to determine the maximum speed at which the vehicle is allowed to be driven.

As will be explained later, one overturning moment which limits stable operation of a truck depends upon the velocity of the truck, and the vertical location of the overall or composite center of gravity ("CG") of the truck combined with its then payload. To accurately calculate a theoretical maximum stable speed for a truck, one must consider the instantaneous CG. Prior systems, which measured load elevation, crudely approximated a value of instantaneous CG.

The payload weight which is carried on the load carriage of a typical lift truck can vary over a wide range, from zero to a maximum rated capacity, such as 4000 pounds. In order to continuously provide an instantaneous speed limit signal which varies in a desired manner with payload weight, it is first necessary to devise a means of continuously determining payload weight, irrespective of payload elevation, and provision of a system for doing that is one important feature of the invention. In accordance with one concept of the present invention, data representing the variation of lift cylinder pressure with elevation of the load carriage, under a reference load condition, such as zero payload, for example, are logged and stored during a "learn" mode, as the load carriage is raised from its lowermost forks-on-the-floor location to its uppermost location. Later, that logged data is used, together with instantaneous data representing lift cylinder pressure, and carriage height, to determine the instantaneous payload on the load carriage.

Dimensions and other factors which govern mast weight and lift cylinder pressure differ widely between lift trucks of different models, and often differ for different lift trucks intended to be like vehicles. Further, some factors which affect lift cylinder pressure often tend to change with time, such as roller wear, frictional effects, and the like. By providing apparatus which will allow the zero-payload pressure vs. elevation characteristic to be readily logged and stored, and hence readily up-dated as wear occurs, acceptable accuracy of the payload weight calculation can be insured.

OBJECTS OF THE INVENTION

One object of the present invention is to provide a lift truck speed-limiting-signal system which is readily applicable to a wide variety of truck configurations. Because of differences in material handling requirements, it is common for lift trucks to be configured in many different arrangements, with various lift trucks having different wheelbases, numbers of mast stages, maximum carriage elevation, and the like. These differences in truck construction can materially affect truck stability.

Another object of the invention is to provide such a system which may be properly installed on a variety of lift trucks without the need for highly trained personnel. In accordance with one concept of the present invention, data which constitute stability criteria for a rather large number of lift trucks are stored in programmable read-only memory (PROM). For example, the data may be that which pertains to 256 different truck configurations. Manually operable selection means are provided to select which of the numerous sets of data will be used aboard a given truck. A given truck ordinarily will use only one of the sets of data throughout its useful life, although selection of a different set may be done if certain modifications are made to a truck. While the provision aboard a truck of many sets of stored data which the truck is not likely to use may seem wasteful, it is important to recognize that such a stratagem reduces the task of installation of the control system on a given truck to mere switch selection of a given one of the set (256 in the example), with no complex installation needed to be supervised by highly trained personnel.

In the manufacture of a lift truck, or any other machine of similar size and complexity, numerous parts made to a tolerance differ, and thus sensors and transducers provided for use with such a system will necessarily differ. Such latitudes have resulted in the ordinary requirement that one or more highly skilled technicians make repeated (and often iterative) adjustments to install and fine-tune a control system for proper operation. In accordance with another important object of the present invention, a microcomputer which governs the operation of a lift truck is provided with a "Learn" mode during which it measures and stores numerous values which cannot be measured and analyzed, by other means, in a reasonable time. The learn mode eliminates the requirement for manual adjustment and also the potential for human errors that might have been introduced through those manual adjustment procedures.

A further object of the invention is to limit truck acceleration as a function of payload height. Limiting acceleration contributes to the stability of the truck, as well as to the comfort of the operator when the operator's station is at a significant height.

SUMMARY OF THE INVENTION

In accordance with one aspect of the present invention, the truck travel speed which can be requested by an operator is limited depending upon load weight, load elevation, truck heading angle, and travel direction (i.e. forward or reverse). Optionally, in some embodiments of the invention, the limiting of truck speed is done in dependence on one or more further factors such as lateral tilt and load moment. In accordance with another aspect, the truck acceleration which can be requested, is limited depending on payload height. A "learning" mode is provided.

The invention accordingly comprises the features of construction, combination of elements, and arrangement of parts, which will be exemplified in the constructions hereinafter set forth, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings, in which:

FIG. 7c is a detailed diagram of the range check of FIG. 7a.

DETAILED DESCRIPTION OF THE DRAWINGS

Figure 1A:
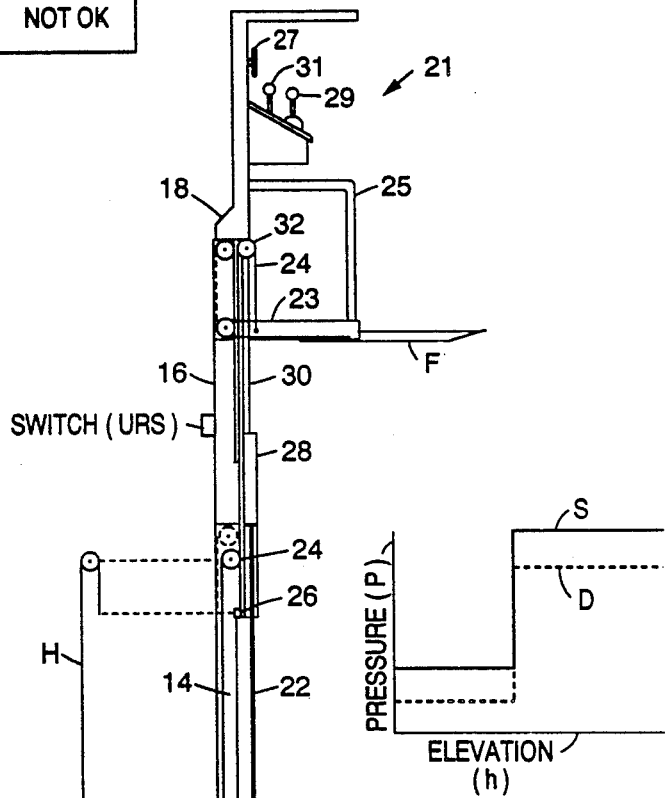
FIG. 1a is a pressure curve showing the variation in pressure as the carriage is raised through elevation h.
Figure 1:
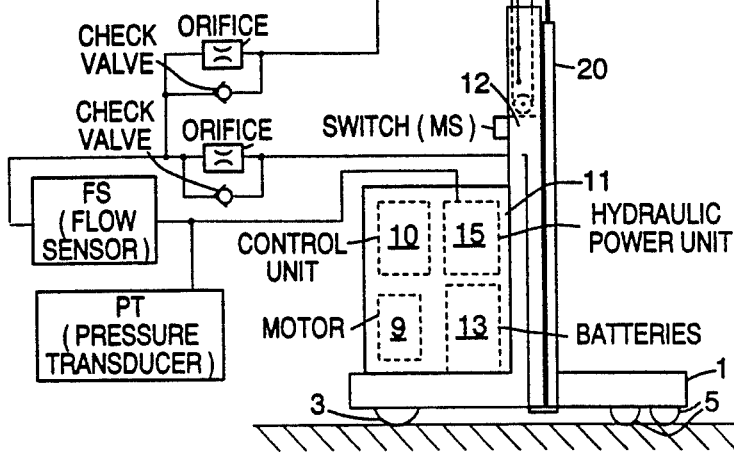
FIG. 1 is a side view schematic diagram showing one form of lift truck mast and hydraulic apparatus associated therewith in accordance with the invention.

Referring to FIG. 1 of the drawings, there is shown in diagrammatic form an elevational view of an industrial lift truck known in the art as an "orderpicker" type, in which the operator's station is mounted on, and travels with, a fork carriage on an extendible mast or upright. The truck comprises a base frame 1 supported by a plurality of wheels. A drive-steer wheel 3 provides the propulsion or traction to drive the vehicle as well as the steering of the truck. Either a single wheel 3 can be used, or a pair of steerable driving wheels can be employed. Load supporting wheels 5 support a major portion of the total weight, including the weight of the truck and operator, and the weight of any payload being carried. A drive unit including a traction or propulsion electric motor 9 is mounted in an enclosure 11, along with storage batteries 13 and a hydraulic power unit 15. Electrical apparatus and a control microcomputer are also enclosed (not shown).

The invention will be described in connection with a particular form of lift truck mast, but it should be clearly understood that the invention is applicable to an extremely wide range of different types of masts and indeed, that the invention may be used with lift trucks of many different types and configurations is an important feature of the invention.

In an exemplary mast system shown in FIG. 1 the base frame 1 of a lift truck carries a stationary mast section 12 which guides vertical movement of a lower or outer telescopic section 14. The outer telescopic section 14 in turn guides vertical movement of an inner telescopic section 16. Inner telescopic section 16 in turn guides vertical movement of a load carriage 18. A main lift cylinder 20 mounted on base frame 1 extends and retracts a ram 22 which is attached to the top of inner telescopic section 14. A chain sheave 24 is journalled on inner telescopic section 14 near the top thereof. A chain 26 having one of its ends attached to the bottom end of inner telescopic section 16 is reeved over sheave 24, and its other end is attached to stationary structure on the mast section 12. With such an arrangement the inner telescopic section 16 will raise or lower at twice the speed at which ram 22 is extended or retracted.

Free lift cylinder 28 affixed to and carried on inner telescopic section 16 extends and retracts a ram 30. Chain 24, connected to load carriage 18, is reeved over sheave 32 (sheave 32 being carried on ram 30) and tied to inner telescopic section 16 (or to the free lift cylinder 28 carried thereon). With such an arrangement the load carriage will be raised and lowered relative to the inner telescopic section at twice the speed at which free lift ram 30 is extended or retracted.

The effective cross-sectional areas of cylinders 20 and 28 are the same, and they are hydraulically interconnected by hose means diagrammatically shown at H in FIG. 1. What is diagrammatically shown in FIG. 1 as a single cylinder 20 may comprise a pair of side-by-side cylinders connected in parallel, in which case the sum of the active areas of the pair is arranged to equal the active area of cylinder 28. Movements of the carriage and telescopic sections occur in successive stages in such a mast system. In lifting from a fully lowered condition, the load carriage moves first to the top of the inner telescopic section, and then telescopic sections 14 and 16 move up simultaneously, taking load carriage 18 with them.

Pressure transducer PT is shown connected to hydraulic system 15. In a typical application transducer PT will have a pressure range of the order of 0 to 5000 psi. Transducer PT may comprise, for example, a Model ASH-K5-050-D-5-C2-5000 pressure transducer available from Ashcroft of Stratford, CT, but any type of pressure transducer having proper response and range may be employed. With the forks F of load carriage 18 fully lowered and resting on the floor or on mechanical stops, transducer PT will sense zero pressure in hydraulic system 15. To initiate lifting, fluid is forced from a known form of hydraulic lifting system 15 through hydraulic flow sensor FS toward cylinders 20 and 28. Carriage 18 will begin to raise as soon as the pressure in the cylinders provides a force on free lift ram 30 which just exceeds twice the carriage weight, where carriage weight is the empty weight of the carriage, plus the weight of any payload aboard the carriage (including the operator). Because cylinders 20 and 28 are hydraulically interconnected, that pressure also will exist in cylinder 20, or the equivalent side-by-side pair of cylinders. That pressure, just adequate to support twice the carriage weight, manifestly will not be enough to raise the greater weight of the carriage plus the telescopic sections, and hence the telescopic sections remain retracted during the free lift stage. Flow sensor FS may be of any suitable type, but preferably is of the type which provides an electrical pulse each time a given volume of hydraulic fluid passes through it. Such pulses are counted and the count included in calculations that provide a value commensurate with instantaneous elevation of the load carriage. In a typical application a flow sensor capable of measuring a maximum of 15 gallons per minute may be provided and one exemplary type of flow sensor is a modified Model FSC500 flow meter available from Flowtech of Mundelein, IL. Such a flow sensor provides a quadrature pulse train at approximately 1175 hertz, per channel, for a 15 gallon per minute flow rate. The phase relationship, of the quadrature encoded pulse train, permits the determination of hydraulic flow direction. The frequency of the pulse train relates to the flow rate. The hydraulic system indicated by the block at 15 may take a variety of known forms.

As the carriage continues to move upwardly during the free lift stage, it eventually engages some mechanical stops (not shown) at the top of inner telescopic section 16. At that instant, which is commonly called "staging", lift supply pressure suddenly increases until it is sufficient to start raising the two telescopic sections. The force on ram 22 is then twice the carriage weight, plus twice the inner telescopic weight, plus the outer telescopic section weight. In FIG. 1a the general manner in which pressure P sensed by transducer PT will vary with carriage elevation h is shown, in dashed lines (D) for a condition where there is no payload aboard the carriage, and in solid lines (S) with a representative payload assumed to be carried. It may be noted that the pressure sensed by transducer PT may vary in accordance with lifting speed and mast roller friction. In FIG. 1 the hydraulic lines leading to the two lifting rams are each shown including a flow-limiting orifice in parallel with a check valve. The use of such orifices and check valves to prevent rapid lowering in the event of hydraulic line breakage is old and well known, and forms no part of the present invention.

If cylinder 28 has the same effective cross-sectional area as cylinder 20 (or a pair of side-by-side cylinders used in lieu of cylinder 20), the amount of fluid flow through sensor FS per amount of raising of the load will be the same during both stages of lifting. If the cross-sectional areas are not the same, the amount by which a given flow sensor pulse increases the accumulated carriage elevation value may be re-scaled as successive lifting stages occur.

In FIG. 1, a first switch diagrammatically shown at MS is mounted on fixed mast section 12 to be operated when the forks F of load carriage 18 are at a known elevation, such as 24 inches above the floor, the elevation being selected to be one through which the carriage passes many times during a typical working day, so that switch MS will be operated frequently. A second switch URS is also provided at a second known elevation to be operated by the carriage. The operation of the two switches causes a predetermined elevation value to be stored in random access memory (RAM) in lieu of the elevation value which has been derived by tallying pulses from flow sensor FS, and serves as a re-setting and error detection feature.

A load engaging and supporting mechanism is provided carrying the usual double lifting fork, and an operator's station indicated generally by reference character 21, all carried by the extendible mast component 16 for vertical movement by raising and lowering the mast elements. The operator's station 21, wherein the operator stands during operation of the truck, includes a platform 23 and side rails 25. The operator's station is also provided with a control console or panel which includes a direction or steering control, such as a conventional steering wheel 27, and a travel direction/speed control or throttle 29, which informs the system of both the travel direction and vehicle speed desired by the operator. Lifting and lowering of the load supports or forks, and the operator's station are governed by an operator's lift/lower controller 31. Various other controls, and indicators for showing the operator the status of various operating conditions, are also included in the console, as will be subsequently described.

Figure 2:
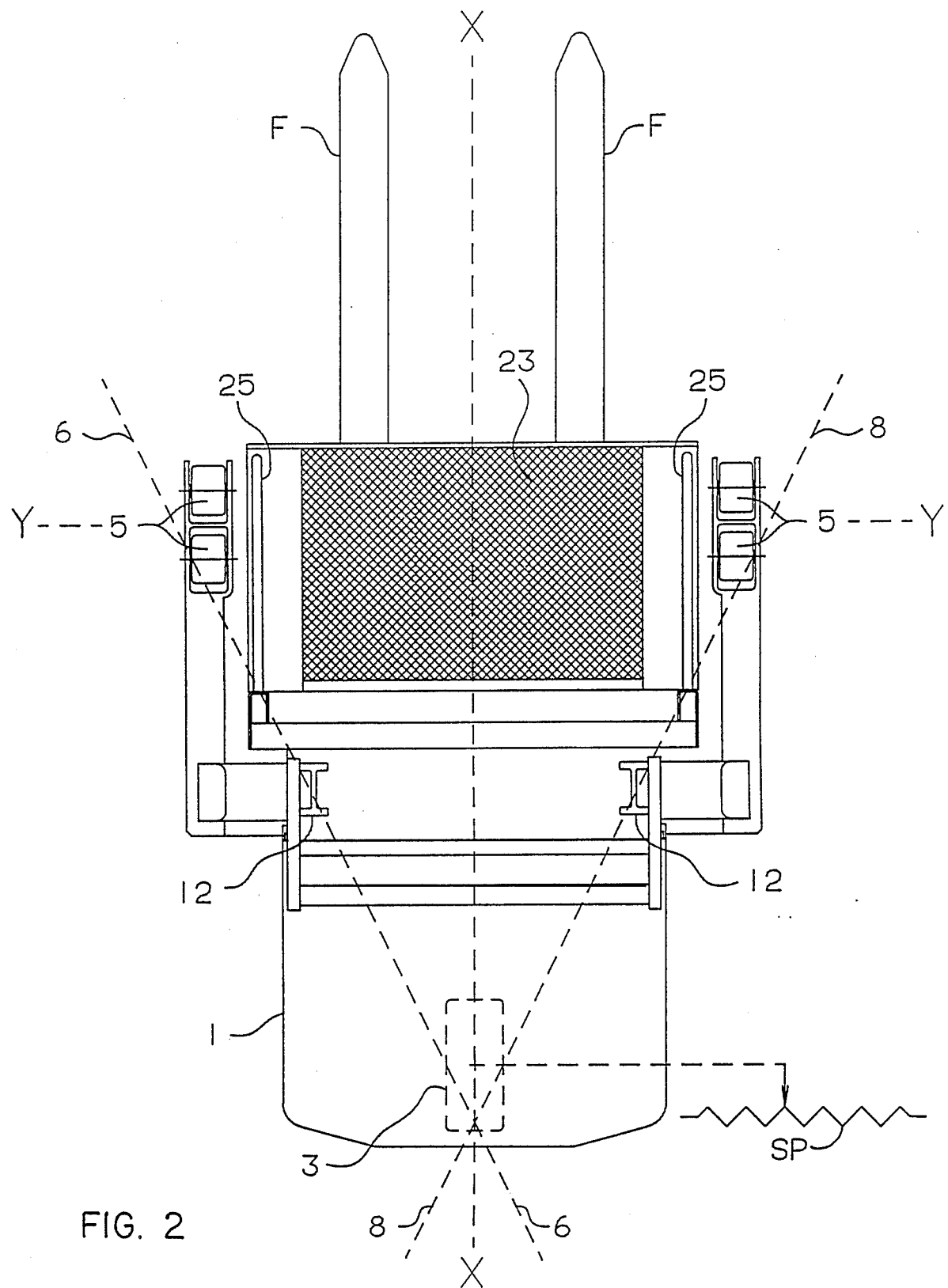
FIG. 2 is a plan view diagram of one form of lift truck, useful in explaining the mechanics involved in some of the novel concepts of the present invention.

In FIG. 2, a lift truck having a base frame 1 is driven by a central rear steerable drive wheel 3, and supported by pairs of unpowered, non-steerable load wheels at 5,5 on each side. A left side axis 6 is shown extending between drive wheel 3 and the load wheel assembly 5 on the left side of the truck, and another axis 8 is shown extending between drive wheel 3 and load wheel assembly 5 on the right side of the truck. If a load is approximately centered laterally on the forks, the overall or composite center of gravity ("CG") of the truck and load will lie on or near centerline x—x. When the truck is standing still on a level surface, a resultant force vector simply comprised of the weight of the truck and the load (not shown) carried on forks F,F will point in between axes 6 and 8. Any static or dynamic situation that causes a resultant force vector to point outside of axes 6 and 8, for a sufficient period of time, will result in the truck toppling about the relevant axis. For example, a floor having sufficient slope can cause the truck to overturn. The truck will topple over leftwardly if the mentioned resultant force vector points leftwardly outside axis 6, or the truck will topple over rightwardly if the direction of the mentioned resultant force vector points rightwardly outside axis 8. The amount of slope which can be tolerated depends upon the location of the composite CG, and that location varies, of course, as a load is lifted or lowered. In FIG. 2 a potentiometer SP is shown connected to be operated in accordance with the heading angle of the steerable drive wheel 3.

As shown in Lewis (4,534,433), when the truck is moving, at constant speed, and turning, at a constant turning radius, on a level floor, the mentioned resultant force vector comprises the vector resultant of a weight vector W which points downwardly, and a horizontal centrifugal force vector. In terms of moments about axis 8, as the truck is turning leftwardly, i.e., its rear end is moving rightwardly, weight W applies a counterclockwise moment of magnitude Wd to the truck, where d is the normal horizontal distance between the composite CG and axis 8, and centrifugal force applies a clockwise moment of magnitude $(W/g)(V^2/r)h$ to the truck, where V is the speed of the truck, r is the radius of turn, g is gravitational acceleration, and h is the vertical distance between the truck CG and axis 8. The truck will topple over if the clockwise centrifugal moment exceeds the counterclockwise weight moment. It will be apparent from symmetry that similar considerations govern a rightward turn. The steady state (i.e. constant radius) speed $V_L$ at which the truck will start to overturn is thus given by:

$$V_L = (gdr/h)^{\frac{1}{2}} \tag{1}$$

It should be noted the d and h terms of equation (1) involve distances to the location of the composite CG, and that location varies, of course, with the payload weight and the carriage elevation, as well as depending upon a fixed base frame weight and its center of gravity. These values are treated as constants in Eq. (1), however, these values will vary significantly during the normal operation of the truck. The location of the composite truck/load CG, at any point in time, can be termed the "instantaneous CG". It should also be noted, that the truck speed as referred to in Lewis, V, is commonly taken to be the speed as defined by the commensurate rotational speed of the drive wheel. The speed of interest, the speed that influences truck dynamic behavior, is the instantaneous speed at the instantaneous CG. The truck speed and CG speed are not necessarily the same, but diverge as a function of the turning radius. No known prior art includes the instantaneous location of the truck/load composite CG, nor the velocity, instantaneous or otherwise, of the CG in establishing a speed limit value. Further, prior art only considers a turn of constant radius. In a preferred embodiment of this invention, an equation (i.e. Eq. 2, subsequently described) that includes consideration of the location of the truck/load CG, the velocity of said CG, and a dynamically decreasing turning radius, is used to calculate an "instantaneous dynamic speed limit value" (IDSLV). It is apparent that truck travel speed limit choices should include an IDSLV.

The locations of axes 6 and 8 will vary, of course, for trucks having different wheelbase lengths and widths. Lift trucks having two rear wheels rather than a single wheel will have axes which are similar to those shown at 6 and 8, but more nearly parallel to each other. In some lift trucks one of the axes which govern overturning may shift as a truck tilts, as is more fully described in U.S. Pat. No. 4,534,433.

It may be noted from consideration of FIG. 1 that the truck thereshown theoretically could overturn about the y—y or lateral axis through the load wheels, or about a lateral axis through drive wheel 3, even if the truck is proceeding along the x—x axis, with a zero steering angle. Either of those types of overturning do not depend upon truck *speed*, but rather on truck *acceleration*. In this discussion, acceleration is used in the sense of causing a change (increase or decrease) in velocity. A control system beneficially should, however, limit truck *speed* in anticipation of what otherwise might require an unacceptable acceleration. The analysis of the dynamic behavior of fork lift trucks, which resulted in the development of Equation (2), included consideration of such accelerations and vehicle turning with a dynamically decreasing turning radius. The latter mode, for example, typically occurs during any significant truck turning activity, such as a turning from one travel path to another path that intersects the first path at 90 degrees.

Figure 3C:
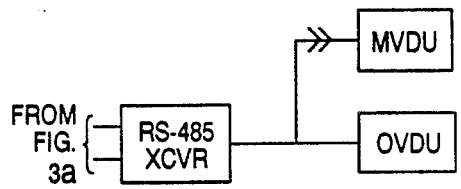
FIGS. 3a, 3b and 3c are diagrammatic views showing a microcomputer and its peripheral equipment as used in a preferred embodiment of the invention.
Figure 3A:
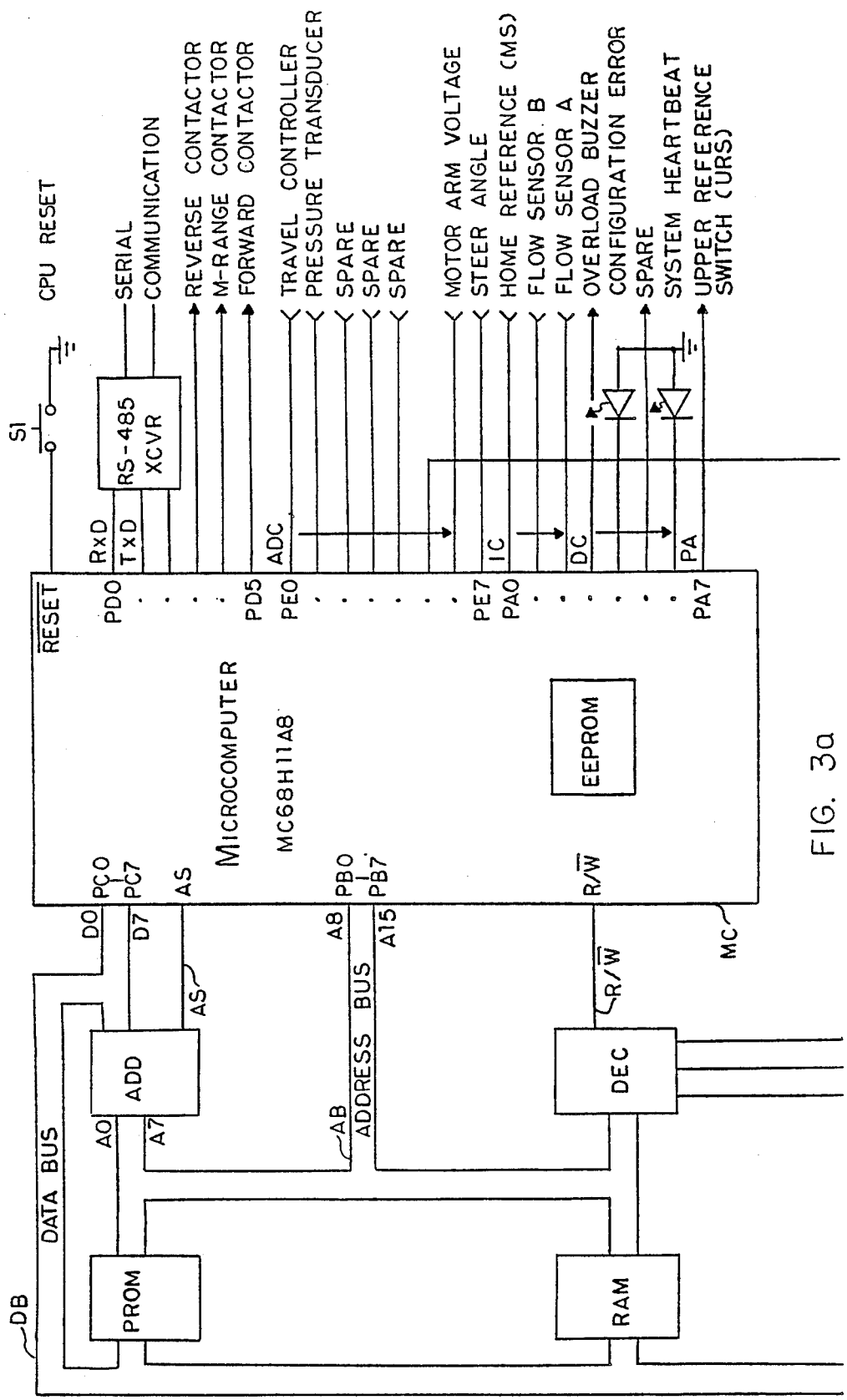
Figure 3B:
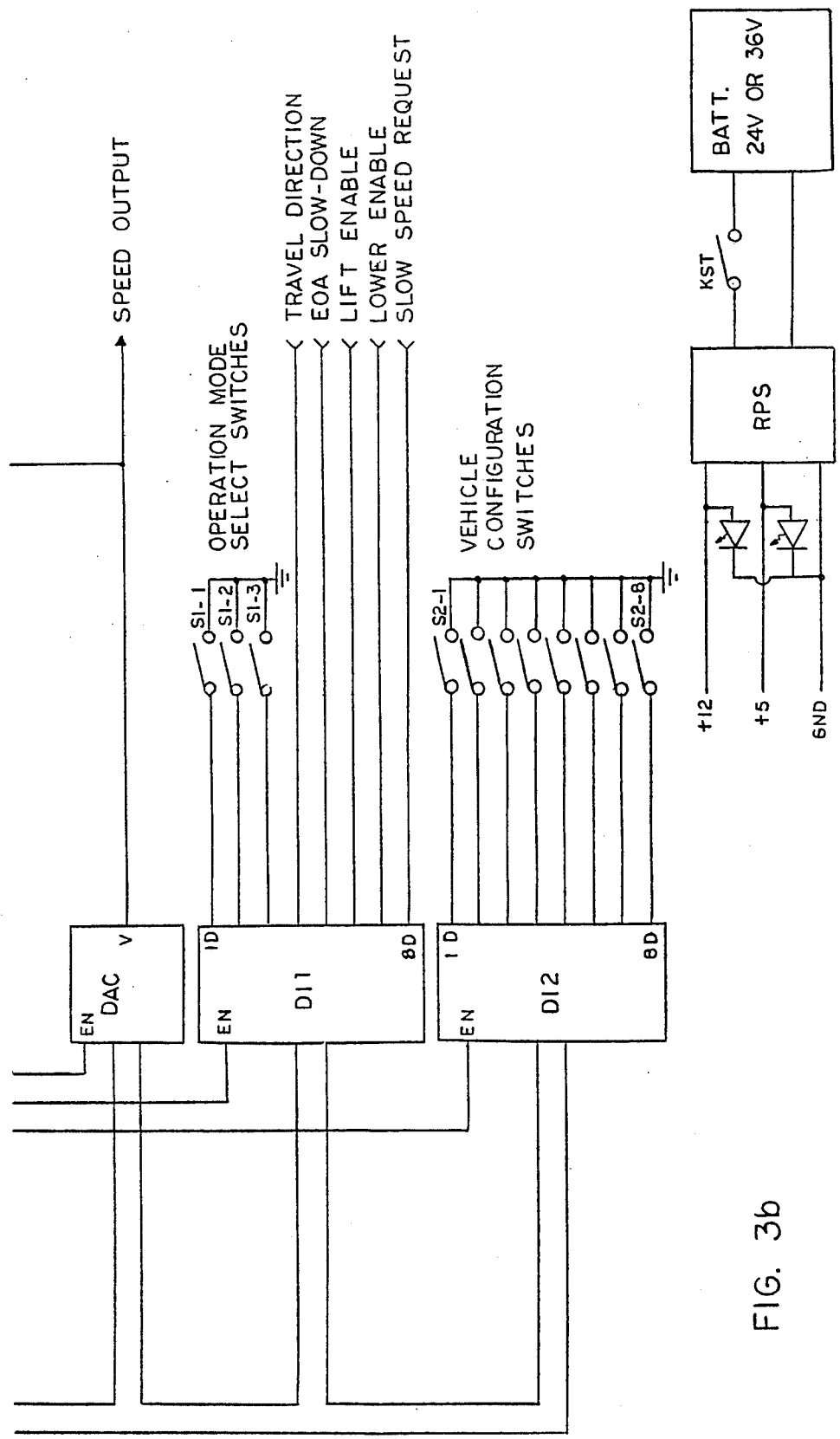

In FIGS. 3a and 3b, taken together with FIG. 3a above FIG. 3b, major aspects of one exemplary embodiment of the invention are illustrated in connection with an MC68HC11A8 HCMOS Single-Chip Microcomputer shown as a block at MC and available from Motorola, Inc., Phoenix, AZ. Various parts and functions of that microcomputer are referred to very briefly below, but described in greater detail in Motorola publication ADI1207R1. It will become apparent as the description proceeds that numerous other microprocessor arrangements and discrete chip arrangements may be substituted without departing from the invention.

In FIG. 3a, the truck operator's key-operated switch KST applies voltage from the truck battery BATT to a regulating power supply RPS, which provides operating voltages for the micro computer and associated devices in conventional fashion.

A reset switch S1 connects a reset terminal $\overline{\mathrm{RESET}}$ to ground when operated, to set the microcomputer to a reset or starting condition. A trio of lines (PD0-PD2) of port D of the microcomputer connect the Receive Data Input RxD and Transmit Data Output TxD lines of the serial communication interface, and a control line of the serial peripheral interface of microcomputer MC to a commercially available RS-485 serial communications transceiver, which sends data via another RS-485 transceiver (shown in FIG. 3c) to an operator's display unit OVDU. The transceiver may send and receive data during any mode. For example, during a learning mode or during a maintenance mode, to a maintenance display unit MVDU, as will be described below.

Eight lines PC0-PC7 of control port C of the microcomputer connect to an 8-bit data bus DB, and to an address-to-data demultiplexer ADD, which controls the eight least significant bits (LSB) of a 16-bit address bus AB. Demultiplexer ADD takes data in from data bus and controls 8 LSB address lines. The signal on line AS clocks the data transfer. The most significant bits of the address bus are controlled by port B (lines PB0-PB7) of the microcomputer. Address bus AB also connects to a 32K-byte programmable read-only memory PROM, and an 8K-byte random-access memory RAM. The address on address bus AB is also decoded by a decoder DEC, under control of R/$\overline{\mathrm{W}}$ line to provide enabling signals to digital input latches and converter to be described below.

Data bus DB is connected to a digital-to-analog converter DAC and to two 8-bit banks of digital input latches, DI1 and DI2. When a selected one of the three output lines of decoder DEC enables digital-to-analog converter DAC, the byte on data bus DB is stored in circuit DAC, providing a specified one of 256 possible output voltages from circuit DAC. The voltage on the output line from circuit DAC comprises the instantaneous speed limit signal mentioned above, and it is applied to the traction motor control circuit as a speed reference signal.

Microcomputer MC includes an eight-channel eight-bit analog-to-digital converter having eight analog input lines at port E terminals PE0-PE7. A voltage proportional to an operator speed request and derived by operator manipulation of a conventional manual travel controller, including a potentiometer, is shown applied as one analog input to the microcomputer. A voltage commensurate with the pressure in a lift cylinder and derived by a pressure transducer (PT, FIG. 1) forms another analog input. Two voltages, each commensurate with the load on a respective tine or load fork, and each derived by means of a load cell or strain gage may also be connected. A voltage commensurate with vehicle steering angle derived from steering potentiometer SP (FIG. 2) forms an additional analog input. Some or all of the above mentioned analog inputs are used by microcomputer MC to calculate the data value that is stored in digital-to-analog converter DAC to provide the instantaneous speed limit signal voltage. In FIG. 3a, the traction motor armature voltage is shown connected as another analog input voltage to microcomputer MC. That armature voltage does not enter into calculation of the instantaneous speed limit value, but it is useful to connect it to the microcomputer for checking purposes. The analog output of converter DAC is also fed back to the microcomputer as shown, line PE5, so that the latter can repeatedly check that the proper instantaneous speed limit signal voltage is being generated.

Microcomputer MC includes an internal pulse accumulator which may be connected to receive pulses from a flow sensor. This flow sensor is, alternatively, a turbine-like device which provides pulses commensurate with flow rate in either direction, but no direction signal. Whether the hydraulic system is lifting or lowering is always evident aboard a truck from whether a "Lift" or a "Lower" device such as a solenoid or a contactor is energized, and the computer is provided with logic signals to indicate whether lifting or lowering is occurring, to determine whether pulse counts should increment or decrement the value in RAM representing instantaneous carriage elevation. A preferred arrangement is to provide a flow sensor which provides both flow and direction signals, for example, a turbine-type flow meter having plural sensing elements which can sense direction of rotation as well as turbine speed. Microcomputer MC receives quadrature pulses from channel B of flow sensor FS (FIG. 1) on line PA1 and pulses from channel A on line PA2 (FIG. 3a). The microcomputer determines which pulse is leading in phase to determine the direction of flow. This determination causes the value in RAM representing instantaneous carriage elevation to be incremented or decremented, as appropriate, by the scaled accumulated count. Other varieties of flow sensor may be selected from the variety available. The microcomputer also receives a logic signal commanding "end-of-aisle slow-down" (EOA) on line 5D of device DI1. Logic inputs from a clinometer or tilt switch arrangement, or other desired inputs, may be connected to lines PE2, PE3 and PE4. In FIG. 3a three digital output signals labeled M-range Contactor, Forward Contactor and Reverse Contactor, are routed from lines PD3, PD4 and PD5 to three conventional lift truck traction motor contactors which are not part of the present invention.

Input PAO receives a logic 1 pulse each time the load carriage of the truck passes through a predetermined elevation to operate switch MS (FIG. 1), and a similar signal is provided on input PA7 from switch URS. A logic signal which indicates whether truck travel is occurring in the forward or reverse direction is also applied to circuit DI1-4D. This signal may be obtained from the traction motor controller. Logic signals indicating whether lifting or lowering is occurring, are derived from the condition of the lift contactor and the lowering solenoid, which are part of conventional hydraulic system 15 in FIG. 1, and are also applied to circuit DI1. A slow speed request logic signal can be received from a known form of wire guidance system if the vehicle loses reception of the guidance signal, and can be used to limit vehicle speed to a low speed so that the truck can reliably "acquire" the guidance wire.

Circuit DI1 is shown receiving eight bits, 1D to 8D. In FIG. 3b, the states of three logic signals applied to circuit DI1 are shown controlled by three switches S1-1 to S1-3. By selective closure of the three switches, any one of eight different system modes may be selected. By selective closure of two of those switches (S1-1, S1-2), the operator can select any one of four operating modes, including a "Normal Run" mode, a "Learn" mode, a "Maintenance" mode, and a further selectable mode, such as an "Emulate" mode.

The eight inputs to circuit DI2, governed by switches S2-1 to S2-8, allow selection of a desired one of numerous different sets of stored data associated with numerous (e.g. 256) different vehicle models.

Digital output lines PA3 thru PA6, can carry digital output signals, having logic levels of 0 or 1, to a variety of vehicle condition signaling devices. Such devices can include, for example, an overload buzzer or other audible signal, a visual overload indicator, signals indicating tilt angle and travel direction, and status indicators such as conventional light emitting diodes (LED's).

Figure 4:
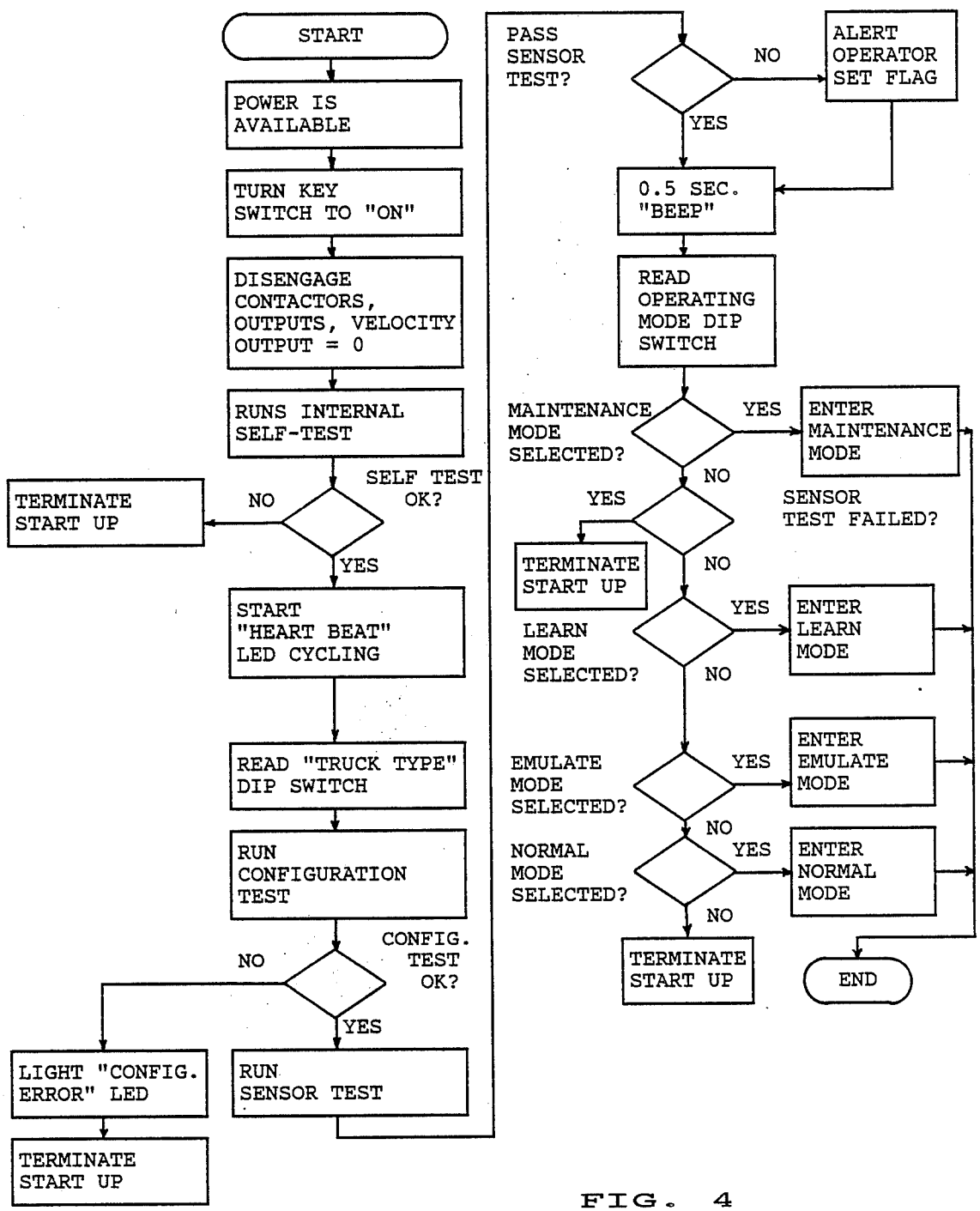
FIG. 4 is a conventional flow diagram illustrating a start up procedure which may be used with the invention.

Referring to FIG. 4, there is shown a flow diagram of the various actions which take place during the startup phase of a truck operation, which takes place before a truck is placed in actual service.

The sequence is shown in a conventional top-to-bottom flow diagram, in which rectangles indicate the action which takes place, and lozenge or diamond-like shapes indicate decision points, where "yes" or "no" types of decisions are required, all as is well known in the art. To facilitate the description, the following verbal description will describe the action as successive functions or branches are encountered, without the use of detailed reference characters or descriptive names of the functional blocks. The following verbal description is easily coordinated with the flow diagram.

At the beginning of the startup procedure, if battery power is available, the turning on of the key switch, causes disabling of the traction contactors, and microcomputer outputs, to provide a velocity output of zero. The microcomputer then runs an internal self test, as commonly implemented in these devices, to ascertain whether or not it is ready to carry out its various functions correctly. If the self test is not satisfactory, the startup procedure is terminated forthwith.

If the self-test is satisfactory, a cyclically-operating "heart beat" indication, including a flashing LED, is initiated, which will indicate on a continuing basis that the microcomputer is functioning properly. The "vehicle configuration" switches are then read for an indicated truck configuration and tested for completeness and validity. If the configuration test is not completed satisfactorily, a "configuration error" signal is displayed by an LED, and the startup procedure is terminated.

If the configuration test is satisfactory, a range check of the various sensor input values is run to determine if they are within allowable limits. If the range check is passed, a distinctive audible signal is provided, such as a half-second "beep" signal. If the test is not passed, the operator is alerted, for example, by a repeating "beep" signal, and suitable flags are set within the microcomputer, for subsequent use.

The operating mode switches are then read, and the desired operating mode is selected, i.e. maintenance, learn, emulate normal, or other mode.

If maintenance mode is selected, that mode is entered and the startup procedure is then ended. If maintenance mode is not selected, then a check is made of the sensor range check flag. If the flag indicates that the test was failed, the startup procedure is terminated. If the test did not fail, then the mode switches are checked to see if the learn mode was selected and if so, learn mode is entered and the startup procedure is ended.

Similar checks of possible entry into the emulate mode are made. If the emulate mode is entered the startup procedure is ended.

Finally, if the normal mode is selected, it will be entered and the startup procedure brought to an end, but if not selected, indicating attempted entrance into a reserved mode, the startup procedure will be terminated.

If, during the startup procedure, the maintenance mode of operation is detected and entered, a sequential set of instructions for the maintenance personnel can be forwarded, over the communication channel and transceiver described previously, to a maintenance visual display unit MVDU, which can take any one of a number of forms. In its simplest form a digital display can provide a series of references, comprising numbers, letters or combinations of both, which will refer the technician to specific printed instructions for various tests to be made, and the results to be expected from such tests, emphasizing values which fall outside desired limits, and providing codes for instructions to remedy detected problems or potential problems. A more elaborate display would comprise a video display unit in which actual instructions, test values, and test results would be presented in textual or graphic form. Yet another form of communication to the technician can be in the form of audible information, ranging in nature from single "beep" codes, to detailed vocal instructions which have been pre-recorded or synthesized.

Figure 5:
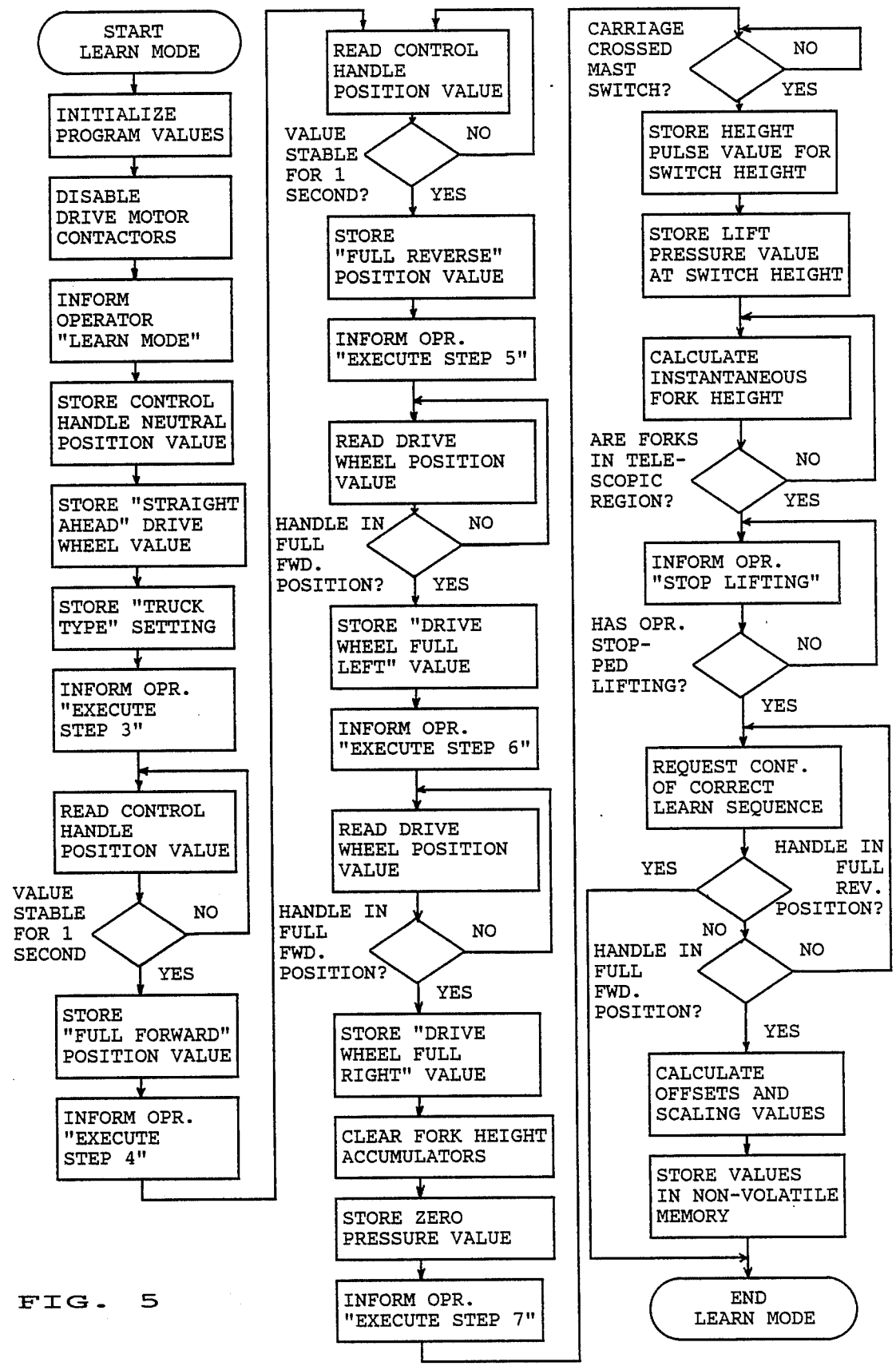
FIG. 5 is a conventional flow diagram of a learning mode procedure which may be used with the invention.

The "Learn" mode of the invention preferably is implemented as illustrated by the flow diagram of FIG. 5, taken in connection with the following verbal description. When starting to operate with switches S1-1 and S1-2 (FIG. 3b) defining the "Learn" mode, the microcomputer executes a predefined learn program stored in PROM. Briefly described, the learn program comprises a series of successive instructions to a technician, the sensing of a machine value upon receipt of a signal from the technician that he has followed a given instruction, storage of the sensed value in RAM memory, and presentation of subsequent instructions until the complete program has been completed. Upon a signal from the technician that all of the steps of the learn mode have been completed, the learn program copies the numerous values it has obtained (or calculated) during the learn program into the nonvolatile electrically-erasable-programmable-read-only-memory, EEPROM, storage area contained within the microcomputer MC.

Since the learning program has a description of the predefined system state for each step of the learn program, and since the system's conversion components have converted the signals into digital format, the program is able to calculate the relationship-constant between the signal and the predefined system state.

If the correspondence between the observed value(s) and the system state under consideration is not linear, the program may take values from several steps and calculate a non-linear relationship.

An exemplary learn mode procedure as shown in FIG. 5 will now be described. In a very simple form of the invention procedure a learn program stored in onboard PROM provides messages to a technician via buzzer code signals or simple 4-digit display, and the technician is equipped with a notebook which explains the messages. In more elaborate forms of the invention, the learn program is stored on media off the truck, and messages to the technician are displayed on the screen of a conventional personal computer, such as an IBM PC-AT. In one form of the learn mode, the technician is not required to execute a predefined sequence of steps. It is sufficient that he exercise the sensors and sub-systems of interest. The learn program interprets the signals as corresponding to certain system states and processes the data accordingly. Initially, the technician is instructed to set the steering wheel to zero degrees while the truck is traveling, to stop truck travel without changing that wheel angle, and to reset the microcomputer. Thus heading angle of the steered wheel is zero degrees as the learn mode begins. Near the beginning of the learn mode, the truck traction motor system is disabled, but the operator travel control handle remains energized so that the technician is able to send various messages to advance execution of the learn program by operating that handle, without actually putting the truck in motion, and by operating other truck controls, as will be seen below.

The operator is given the message "Learn Mode" to indicate that that mode will now proceed. The travel control handle is placed in its neutral position and the digitized position value is stored, as is the "straight ahead" steered wheel value. In each case where a position value is to be determined, the input value may be sampled several times over a time interval of predetermined duration, for example, one second. The average of the sampled values is calculated and that is the value that is stored.

The technician then checks whether the eight DIP switches (S2-1 thru S2-8, FIG. 3b) which specify vehicle configuration are correctly positioned for the type of truck he is working on, and the "vehicle configuration" setting is stored in RAM. Next the technician is asked to put the operator's travel controller in the full forward position (step 3).

The learn program samples the voltage from the potentiometer of the travel controller several times and stores the average of the sampled values for the full forward position in RAM.

Another message instructs the technician to release the travel controller handle, and that spring-centered handle returns to its neutral position. A further message instructs the technician to move the control handle to the full reverse position (step 4), and then a "full reverse" signal is sensed and stored in RAM in similar fashion. In similar fashion, values are sensed from the steered drive wheel angle sensor and stored in RAM for step 5 "drive wheel full left" and step 6, "drive wheel full right" positions. The steering wheel angle sensor may be a shaft encoder, though a simple potentiometer is shown in FIG. 3. Completion of these two steps is signaled to the microcomputer by placing the control handle in the full forward position when prompted by further messages.

An important part of the learn mode involves sensing the pressure contribution of the truck mast. The technician fully lowers the load carriage, and then moves the travel control handle momentarily to the full-forward position, for about 0.5 second, and then releases it. That travel control signal is interpreted by the program as confirmation that the forks are fully lowered. The program clears the fork height accumulators and digitizes the signal generated by pressure sensor PT (FIG. 1), to get a digital zero pressure value representing no load on the lift system. This zero-load transducer offset value is digitized and stored in RAM. The technician is then prompted to "Execute step 7" and in response moves the truck lift/lower control to raise the carriage at full lift speed through and just past the "free-lift" stage. As the carriage rises, pulses are counted from flow sensor FS, until switches MS and URS are operated. The program uses the vehicle configuration input data as an entry point into a table stored in memory to retrieve a value representing the elevation of switch MS and the distance between the switches, and to retrieve a value corresponding to a "gallons per foot" constant which relates hydraulic volume to carriage rise during the initial carriage rise. By dividing the pulse count input from the flow sensor FS by the elevation of switches MS and URS, and multiplying by the reciprocal of the volume constant, a "pulses per gallon" is calculated, and stored in RAM. This value may be used to calculate carriage elevation even though the relationship of volume to elevation, over the entire elevation range, is not linear.

While the load carriage was being raised, the signal from pressure sensor PT is digitized and stored in RAM as the carriage operates the switch MS and URS, thereby providing the pressure which exists, with no payload on the forks, for the free lift range of lifting. After a computation including the flow meter FS derived pulse count, the recently calculated value and the predefined vehicle configuration data, indicates that "staging" has occurred, the pressure signal from sensor PT is again digitized and stored in RAM. That value will reflect, of course, the added weight of the telescopic mast sections 14 and 16 (FIG. 1). Once again, using the vehicle configuration value as entry into a table, the predefined heights corresponding to the free lift and telescopic lift regions are retrieved. These learned pressure values and known height values, are used to define the fork-height vs. lift-system-pressure relationship, for the unloaded condition, (FIG. 1a) for this particular truck. The values describing this relationship are then stored in RAM.

After program steps of the types set forth above, the learn program sends a message indicating that value sampling has been completed. If the technician believes that the learn procedure was properly executed, he responds with a pre-arranged signal, such as moving the travel control handle full forward. This confirmation of the learning sequence by the technician causes the system to copy the appropriate values which were stored in RAM during the learn procedure into the nonvolatile EEPROM aboard microcomputer MC. If the technician instead signals that the learn procedure is believed to have been done improperly by moving the travel control handle to full reverse, for example, the learn program is terminated without updating the EEPROM.

At the end of a successful learn mode, the technician then may set the mode switches to the "Normal Run" mode, normal mode will then be executed using the values obtained during the just completed learn mode. Should learn mode be ended unsuccessfully, normal mode may be enabled and will execute using the values learned during the last *successful* learn mode.

By sensing, digitizing, and storing various machine values in the above-described manner during the learn mode, the invention dispenses with tedious adjustment procedures necessary with prior art lift trucks. For example, assume that the steered wheel heading angle potentiometer should provide an exact zerovolt output when the steering angle is zero degrees, but that various manufacturing tolerances result in a voltage of 0.1 volt at that steering angle. Since the learn mode senses and stores that value, that offset data is available for compensating across the sensor's range.

The next selectable mode as shown in the startup flow diagram of FIG. 4 may be an "emulate" mode. No specific flow diagram is shown for this mode, and suffice it to say that the procedures accomplished in this mode are directed to emulation of other types of existing control systems, not forming a part of the present invention.

In the "Normal Run" mode a program repeatedly cycles through a loop which includes sensing the numerous input parameters and providing the output signals noted in FIGS. 3a and 3b. In a typical application the instantaneous speed limit signal will be updated at least several times a second.

When the normal mode (FIG. 6) of operation is started or entered, all the program variables are set to predetermined initial values. While operating in normal mode, all input values are repeatedly read and range checks are made to insure that no values are in excess of predetermined, or learned, limits. In the event that the range checks are not successfully completed, the operator is informed by audio and/or visual signals, and appropriate travel speed limits are set. If range checks are successful, the program proceeds to scale (i.e. computes or derives from a stored table) the various input values as required, tailors the operator's control handle signal value, calculates the limit values for positive and negative acceleration, calculates the instantaneous dynamic speed limit IDSLV, and the capacity related limit.

Figure 6:
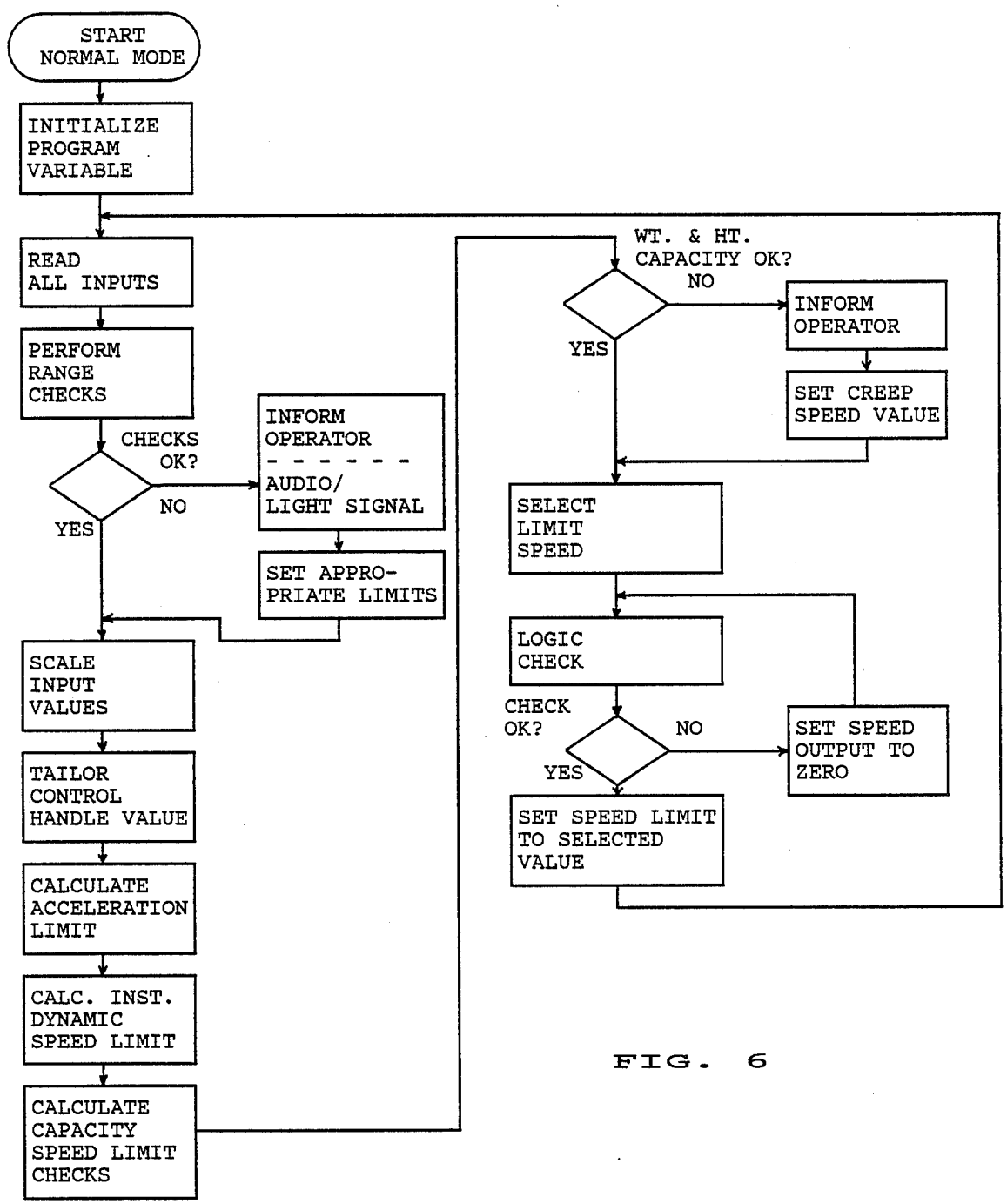
FIG. 6 is a conventional flow diagram of a normal or operating mode procedure which may be used with the invention.

The next step in the flow diagram shown in FIG. 6 is to determine if the weight is proper for the instantaneous height. If not, a message is provided to the operator and a travel speed limit value of 12% of full speed, i.e. "creep speed", is generated. A speed limit is selected by the program from the several speed limits determined (i.e. NC, IDSLV, HWC, ALSR). This step is followed by a logic check. For example, the instantaneous dynamic speed limit function may generate some minimal (i.e. less than 1.0 mph) speed limit value. However, if the heading angle is greater than 10°, the logic check is not satisfactory, and the instantaneous speed limit is set to zero to prevent any truck travel. If the logic check is satisfactory, then the selected speed limit is accepted and the instantaneous speed limit is set to that recently selected value.

A program loop is provided via a loop path designated LP, which returns the program to the step of reading all inputs, and the program is thereby successively repeated. Depending upon the basic clock frequency of the microcomputer, the instantaneous speed limit signal will be updated at least several times each second, so that the response of the total system is essentially real-time. This is desirable so that the operator does not perceive a lag between his input to the system and the systems response.

The invention may use any of a variety of different algorithms to generate the instantaneous speed limit value that is outputted by digital to analog converter DAC as a voltage level signal, and differing algorithms will be desired in various types or configurations of lift trucks.

Figure 7C:
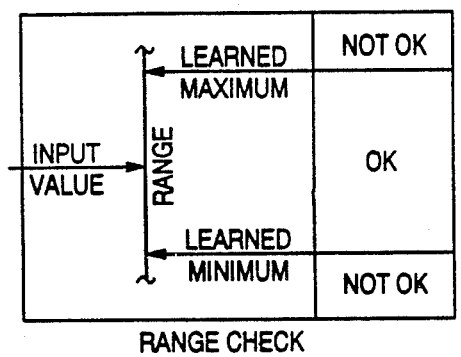
Figure 7A:
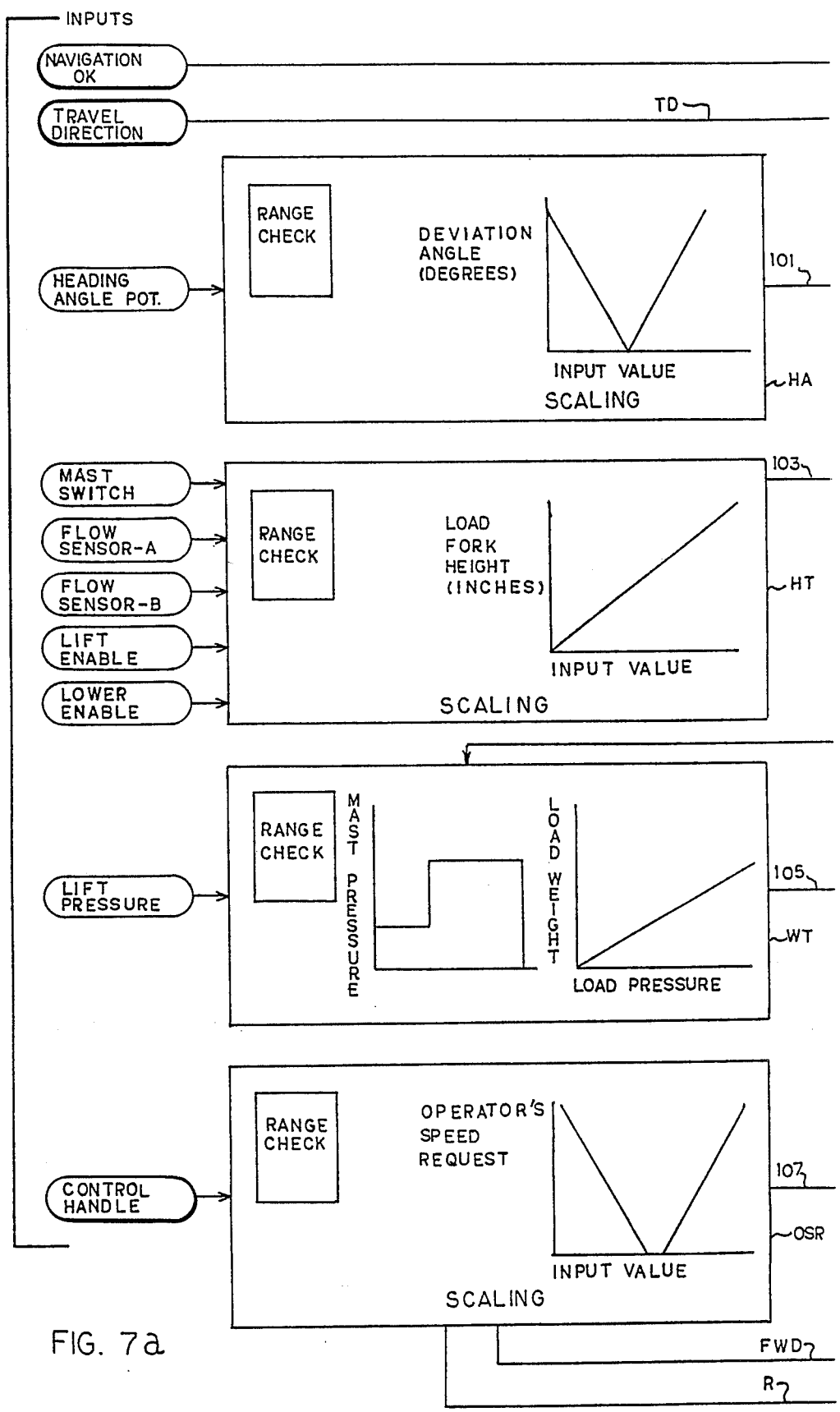
FIGS. 7a and 7b comprise an information flow, or architectural diagram of the operation of the present invention.

The following equation illustrates one example of an equation that will accomplish the calculation of an instantaneous dynamic speed limit value IDSLV, reference block IDSL, FIG. 7a. Differing equations may be desired for various vehicle configurations.

$$V = F(C_1 - C_2L - C_3H)(1 - A_S/C_4) \quad (2)$$

where V is the instantaneous velocity, as measured at the drive wheel, below which the aforementioned resultant vector points within the axes 6 and 8. F is a factor depending on forward or reverse travel. L is the payload on the load carriage. H is fork elevation. $A_S$ is heading angle. $C_1$ through $C_4$ can be constants associated with a particular vehicle type and configuration.

The equations that completely describe the dynamic behavior of a fork truck are very complex and excessively time consuming in solution. Due to this complexity, it would be impractical to solve the complete equations in a real time manner on a truck. The constants $C_1$ thru $C_4$, and the form of Eq. (2), are the result of analytical solutions of the dynamic behavior equations for a particular vehicle configuration. It should be noted, that solutions for other vehicle types and configurations result in like sets of constants and equations similar to Eq. 2. Equation 2 is a derived expression that provides a value for V that is in accordance with the complete dynamic analysis, yet is not time consuming in solution. The determination of Eq. 2, and like equations, as well as their use in determining instantaneous speed limit values is a key element of this invention.

The digital value representing steering potentiometer position is checked to determine that it lies within a range represented by stored maximum and minimum values, the stored offset value is algebraically added to provide a corrected value, and the corrected value is multiplied by a stored steering potentiometer scale factor to provide a digital steering angle value which is used in computing the IDSLV.

When lifting or lowering of the carriage is in progress, the flow of hydraulic fluid causes flow sensor channels A and B to generate pulse trains that are quadrature encoded. Each occurrence of a pulse edge detected on input lines PA1 or PA2 causes the program to ascertain the direction of fluid flow. The appropriate pulse count accumulator (ascending or descending) is then incremented. On a regular basis, the pulse count stored in the ascending accumulator is multiplied by a "height" (elevation) scale factor to convert the pulse count to inches and this inch value is added to the instantaneous height register, located in microcomputer MC, and the pulse count stored in the descending accumulator is also multiplied by a scale factor and this inch value is subtracted from the instantaneous height register. The ascending and descending accumulators are then set to zero and a range check is made to insure that the elevation value lies within a range defined by maximum and minimum values. Each time the load carriage operates switches MS and URS, the pulse accumulator is reset to the stored home-switch-position value.

A mast/carriage pressure value is selected from the mastheight/pressure table using the mentioned elevation value. The mast/carriage pressure value is subtracted from the digitized pressure value from transducer PT to provide a preliminary load pressure value. This preliminary pressure value is multiplied by the stored weight scale factor to provide a preliminary load weight value. The preliminary load weight value is then given a range check, using stored maximum and minimum values, and averaged over time to provide a load weight value.

The value obtained by digitizing the voltage from the travel control handle (FIG. 1, #29) potentiometer first is given a range check. Then that value is processed by a folding algorithm of the following nature. If an input value is above a first predetermined value, the input value less the predetermined value is passed and a Forward logic signal is provided, and if the input value is below a second predetermined value, the absolute value of the second predetermined value less the input value is passed and a Reverse logic signal is provided. The difference between the first and second predetermined values is the deadband width. If the input value falls between the first and second predetermined values, i.e. within the deadband, then a value of zero is substituted. For values that are not within the deadband, the passed value is then tailored by multiplying it by stored speed request scale factors to provide a requested speed value. The use of multiple scale factors provides a requested speed value that is non-linear with respect to the input value.

Figure 7B:
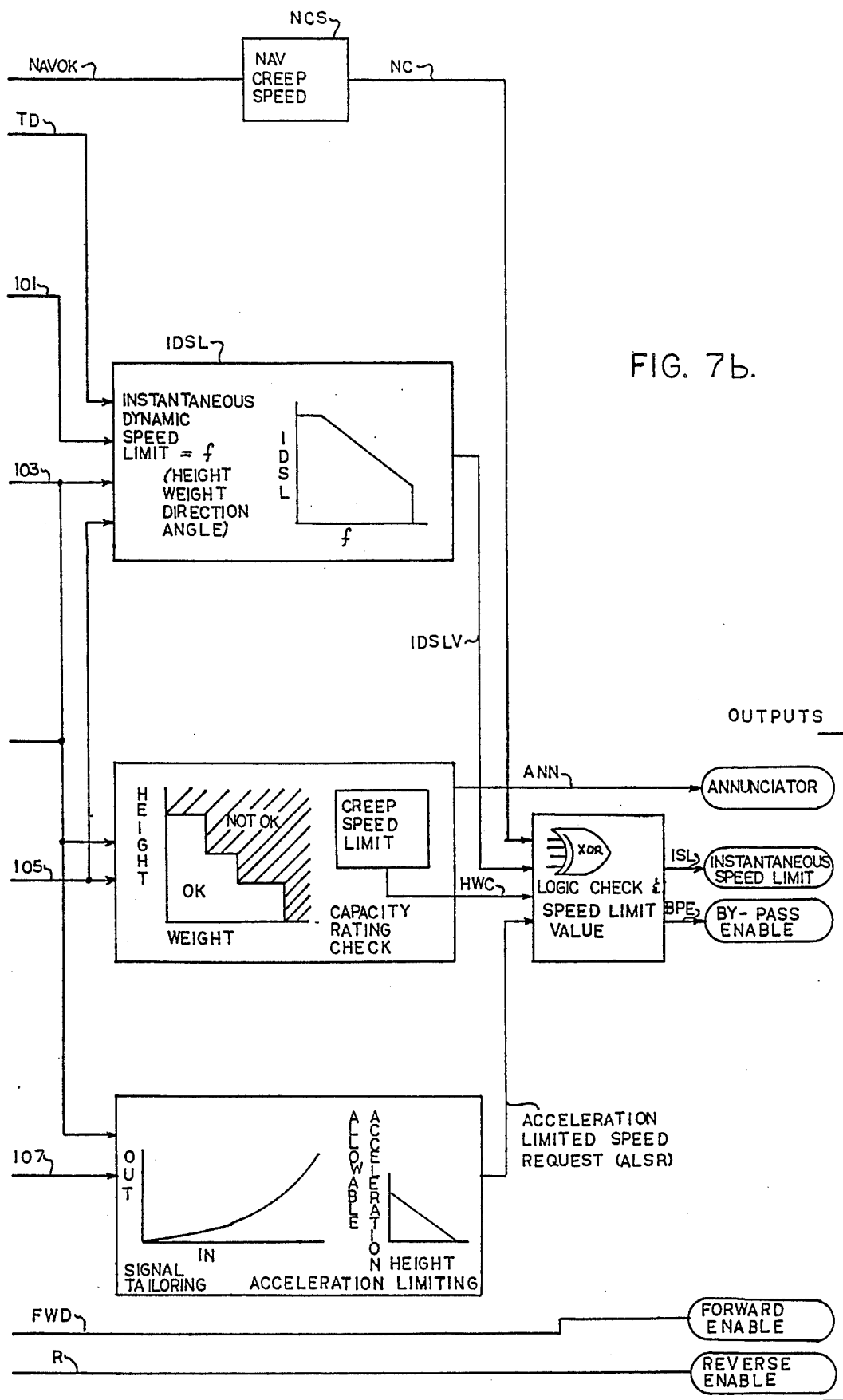

FIGS. 7a and 7b show a schematic block diagram of information flow in the system when operating in the normal mode, or what may also be termed the architecture of the normal mode program, and can be considered as an alternative description of the program shown in FIG. 6 and described above.

For three of these four factors, as well as the operator's speed request, the raw input data is first subjected to a range check, the detailed considerations of which are shown in FIG. 7c in the rectangle titled "Range Check". In each case, the input values are checked against learned maximum and learned minimum values. The range of the input values between the learned maximum and learned minimum are deemed satisfactory, and values above and below those learned maximum and learned minimum are deemed unsatisfactory. If the inputs are not satisfactory, suitable warnings and inhibiting actions are enabled. If the range checks are satisfactory, appropriate scaling functions, averaging, and resetting functions where necessary are invoked, as illustrated graphically in the rectangles designated by reference characters HA, HT, WT And OSR, for the factors heading angle, fork height, load weight and operator's speed request.

One set of outputs from the function OSR comprises the directional control signals having the legends FORWARD and REVERSE, which govern the direction of travel of the truck, depending on the direction of motion of the control handle. To provide for a bounded control handle neutral, a "dead band" is provided for a short range in either direction from the neutral position. Within the dead band, the velocity commands will be zero. To provide enhanced control at lower speeds, the signal is tailored in a non-linear manner.

The scaled value outputs from the functions HA, HT, WT and OSR, on lines 101, 103, 105 and 107 are supplied as inputs to the desired functions, shown as rectangles with legends and graphic illustrations and designated by reference characters IDSLV, H/W and ACCL, standing for Instantaneous Dynamic Speed Limit, Height-Weight capacity and Acceleration limiting respectively. ANGLE, HEIGHT and LOAD WEIGHT signals from HA, HT and WT, respectively, along with TRAVEL DIRECTION are supplied to block IDSLV. HEIGHT and WEIGHT signals are supplied as inputs to the H/W capacity function, and the HEIGHT and OPERATOR's SPEED REQUEST signals are supplied to the function ACCL.

From the scaled values supplied thereto, the function IDSL derives an output according to a predetermined equation, such as the one previously discussed, and supplies a final output IDSLV, standing for Instantaneous Dynamic Speed Limit Value.

The H/W function derives a signal from the height and weight inputs in accordance with the graphic expression shown within the rectangle. If the function of height and weight falls within certain values, a satisfactory signal is developed. If the function falls outside of the allowable values, the output signals an unsatisfactory condition. This function then develops a creep speed limit value which is supplied as a HWC output signal from function H/W.

An additional output is provided from the H/W function, an annunciator which indicates abnormal height/weight combinations. The annunciator can take several forms, such as a buzzer or a light.

The HEIGHT and OPERATOR's SPEED REQUEST signals are supplied to the acceleration limiting function ACCL, where the signals are tailored by reference to tables of non-linear values, so that the function takes on the non-linear form shown in the left hand graph. Under some circumstances, it may be preferable to calculate this signal tailoring rather than make use of tables. Thereafter, the height of the carriage is used to determine an acceleration limit and the speed requested by the operator is so processed that the speed limit value output from this function will not cause a violation of said acceleration. The output of the ACCL function, designated as ACCELERATION LIMITED SPEED REQUEST, is supplied to the function entitled SPEED LIMIT VALUE SELECT, designated by reference characters SLVS.

Also, an input signal NAVOK from a navigation system (if used) such as a wire guidance system, is supplied to function NVC, which stands for NAVIGATION CREEP SPEED. Should the navigation system require it, this function will supply a creep speed value NC to function SLVS.

The logic symbol for an EXCLUSIVE OR function (XOR) indicates that the function SLVS selects the least value of the inputs at any given time to provide instantaneous speed limit value selection. Two outputs are provided by function SLVS, INSTANTANEOUS SPEED LIMIT designated by reference characters ISL, and a BYPASS ENABLE, BPE.

From all of the foregoing, it will be apparent that the present invention provides a novel control system for lift trucks, particularly of the "orderpicker" type, in which an instantaneous dynamic speed limit is calculated by a microcomputer from inputs representing heading angle, fork height, load weight, and travel direction. A particular feature of novelty, is the inclusion of a derived equation, reflecting the complete dynamic behavior of a fork truck, defining said calculation. Another particular feature of novelty is the provision of a "learn" mode, whereby appropriate offset values are provided for the digital computations, thereby eliminating time consuming and costly manual measurements and adjustments. Thereafter the range of values provided by various components of the system are checked that they are in appropriate ranges.

Although there is herein shown and described only one preferred embodiment of the invention, it will be understood by those skilled in the art to which the invention appertains that various changes and modifications may be made therein without departing from the spirit and scope of the invention.

What is claimed is:

1. In a lift truck having a steerable base frame, a mast, a hydraulic lift system operable to move a load carriage along said mast to raise and lower a payload, a traction motor system for driving said truck, and an operator control for generating a speed request signal for requesting variation of the speed of said traction motor system, the combination comprising:
   (a) means for deriving a first signal commensurate with the position of said load carriage along said mast;
   (b) means for deriving a second signal commensurate with the steering angle of said base frame;
   (c) means for deriving a third signal commensurate with the weight of the payload on said load carriage; and
   (d) means responsive to said first, second, third, and speed request signals for providing a speed limit signal, said speed limit signal being supplied to said traction motor system to limit the speed of said truck.

2. The lift truck as claimed in claim 1, wherein said means for providing the speed limit signal includes a microcomputer.

3. A lift truck as claimed in claim 1, wherein said means for deriving said first signal comprises means for sensing fluid flow into and out of said hydraulic lift system.

4. The lift truck of claim 3 wherein said means for sensing fluid flow is operative to provide quadrature encoded pulse trains for detecting direction of flow and flow rate.

5. The apparatus of claim 3, wherein the fluid flow sensing means is a quadrature flow sensor.

6. The apparatus of claim 3, wherein the hydraulic lift system includes a lift cylinder, the fluid flow sensing means is in fluid communication with the lift cylinder, and the fluid flow sensing means includes a means for generating a pulse each time a first volume of hydraulic fluid passes into or out from the lift cylinder.

7. A lift truck as claimed in claim 1, wherein said means for deriving said third signal includes means for sensing the pressure in said hydraulic lift system.

8. In a lift truck having a steerable base frame, a mast, a hydraulic lift system operable to move a load carriage along said mast to raise and lower a payload, a traction motor system for driving said truck, and an operator control for generating a speed request signal for requesting variation of the speed of said traction motor system, the combination comprising;
   (a) means for deriving a first signal commensurate with the position of said load carriage along said mast;
   (b) means for deriving a second signal commensurate with the steering angle of said base frame;
   (c) means for deriving a third signal commensurate with the weight of the payload on said load carriage;
   (d) means for deriving a fourth signal commensurate with the direction of travel of said truck; and
   (e) means responsive to said first, second, third, fourth, and speed request signals for providing a speed limit signal, said speed limit signal being supplied to said traction motor system to limit the speed of said truck.

9. A lift truck having an operator control to provide an output voltage, a converter means for converting said output voltage to a digital signal, sensors for generating sensor signals indicative of operating states of the lift truck, and a computer connected to the converter means and the sensors, wherein the computer includes a non-volatile memory, and wherein the computer is programmed to generate signals for instructing an operator to position said operator control to a plurality of successive position, to generate signals for sampling said digital signal and said sensor signals when said operator control is at each of said successive positions, to generate respective digital operating state signals, and to store said digital operating state signals in the non-volatile memory, so that the stored digital operating state signals may be further processed during generation of a truck speed limit signal.

10. A control system for a lift truck having a fork, comprising: a plurality of sensors each providing a respective output voltage,
   converter means for converting the output voltages to digital signals,
   a computer, programmed with a learning program for prompting the sampling of successive ones of said sensors to provide a first group of output voltages from said sensors and a corresponding first group of digital signals,
   non-volatile storage means for storing said first group of digital signals, wherein the computer is also programmed to generate operating digital signals for controlling operation of the lift truck, in accordance with selected ones of said first group stored in said non-volatile storage means.

11. The system of claim 10, wherein a first one of the sensors emits electrical pulses indicative of the height of the fork, and also including: pulse counter means for counting said electrical pulses to provide a first digital signal, wherein the computer is programmed to prompt said operator to operate a control device to cause said first one of the sensors to emit said electrical pulses, and means for storing the digital signal from said pulse counter means in said non-volatile storage means.

12. A method of operating a lift truck, including the steps of: operating a series of controls aboard said truck to generate signals indicative of operating parameters of the truck in a learning mode; digitizing the signals to provide a first plurality of digital signals; storing said first plurality of digital signals in a non-volatile memory; generating normal mode signals indicative of operating parameters of the truck in a normal operating mode; digitizing the normal mode signals while said truck is operating in said normal operating mode to provide a second plurality of digital signals; comparing signals of said second plurality with corresponding signals of said first plurality stored in said non-volatile memory and limiting the maximum speed of said truck in accordance with the results of said comparison.

13. In a lift truck having a mast, a load carriage for supporting a payload, and hydraulic power means for raising and lowering said load carriage and payload along said mast, the combination comprising;
    (a) means for sensing the weight imposed on said hydraulic power means with a given payload supported on said load carriage to provide a first data value;
    (b) means for determining the position of said load carriage along said mast to provide a second data value;
    (c) data storage means containing a group of data values each representing the weight imposed on said hydraulic power means with said load carriage at a predetermined position along said mast and with a reference payload weight on said load carriage;
    (d) means responsive to said second data value for selecting a data value from said group;
    (e) means comprising microcomputer means for combining said selected data value and said first data value to provide a third data value commensurate with the weight of the given payload on said load carriage; and
    (f) means responsive to said third data value for generating a speed limit signal for limiting the speed of said truck.

14. The combination as claimed in claim 13, also including a pair of switches for sensing the presence of said load carriage at a predetermined position along said mast, and means responsive to the operation of said switches for resetting said second data value to a predetermined value.

15. The combination as claimed in claim 13, wherein said hydraulic power means includes a lift cylinder, and said means for sensing the weight imposed on said hydraulic power means includes a pressure transducer responsive to the hydraulic pressure in said lift cylinder.

16. The combination as claimed in claim 15, wherein said means for determining the position of said load carriage includes means for sensing fluid flow into and out of said lift cylinder to provide said second data value.

17. The combination as claimed in claim 13, also including means for updating the data values of said group.

18. A method of generating speed limit values for a lift truck, comprising the steps of:
    in a learning mode, storing a first set of data values representing operating parameters of the truck;
    in a normal operating mode in which the truck supports a payload, deriving a second set of data values representing operating parameters of the truck, including a data value representing the weight of the payload;
    processing the first and the second set of data values to generate an instantaneous truck velocity signal and an instantaneous dynamic speed limit signal, and controlling the speed of said truck in accordance with the value of said instantaneous dynamic speed limit signal.

19. In a lift truck having a mast, a load carriage for supporting a payload, power means for raising and lowering said load carriage and payload along said mast, and a traction motor control system, the combination comprising:
    means for storing a first set of data values indicative of operating parameters of the truck in a learning mode;
    means for determining the height of said load carriage and payload in a normal operating mode of the truck, and for deriving a height data value representing said height; and
    means governed by said height data value and said first set of data values for governing said traction motor control system to limit the acceleration of the truck as a function of the height of the load carriage.

20. In a control system including a displacement sensitive manual control, means for providing a predetermined non-linear relationship between the position of the manual control at the mid-range of displacement of said control, and a control output signal comprising means for generating a first set of data values representing a plurality of positions of said control in each direction from its neutral or midpoint of travel, data modifying means for modifying said first set of data values to provide a second set of data values having a desired non-linear relationship to said first set of data values and means for generating a control output signal from said second set of data values.

21. In a lift truck having a steerable base frame, a mast, a hydraulic lift system operable to move a load carriage along said mast to raise and lower a payload, a traction motor system for driving said truck, and an operator control for generating a speed request signal for requesting variation of the speed of said traction motor system, the combination comprising;
    (a) means for deriving a first signal commensurate with the position of said load carriage along said mast;
    (b) means for deriving a second signal commensurate with the steering angle of said base frame;
    (c) means for deriving a third signal commensurate with the weight of the payload on said load carriage;
    (d) means for deriving a fourth signal commensurate with the instantaneous location of the center of gravity for said truck; and
    (e) means responsive to said first, second, third, fourth, and speed request signals for providing a speed limit signal, said speed limit signal being connected to said traction motor system to limit the speed of said truck.

22. The apparatus of claim 21, wherein the fourth signal is generated from the first, second third, and speed request signals.

* * * * *